(12) United States Patent
Kohn

(10) Patent No.: US 7,173,738 B2
(45) Date of Patent: Feb. 6, 2007

(54) METHOD OF PRODUCING TRAPS IN A PRINT PAGE

(75) Inventor: Michael Kohn, Neumünster (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1004 days.

(21) Appl. No.: 10/139,194

(22) Filed: May 6, 2002

(65) Prior Publication Data

US 2003/0011796 A1 Jan. 16, 2003

(30) Foreign Application Priority Data

Jun. 15, 2001 (DE) ................. 101 28 858

(51) Int. Cl.
*G06K 15/00* (2006.01)
*H04N 1/41* (2006.01)

(52) U.S. Cl. .................. 358/2.1; 358/426.13

(58) Field of Classification Search ........ 358/2.1, 358/3.27, 3.15, 426.01, 426.13, 1.9
See application file for complete search history.

(56) References Cited

U.S. PATENT DOCUMENTS

| | | | |
|---|---|---|---|
| 5,113,249 A | 5/1992 | Yosefi | |
| 5,295,236 A | 3/1994 | Bjorge et al. | |
| 5,542,052 A | 7/1996 | Deutsch et al. | |
| 6,844,942 B2 * | 1/2005 | Rumph et al. | 358/1.9 |
| 2003/0011796 A1 * | 1/2003 | Kohn | 358/1.9 |
| 2003/0025945 A1 * | 2/2003 | Rumph et al. | 358/426.13 |
| 2004/0201865 A1 * | 10/2004 | McElvain | 358/1.9 |

FOREIGN PATENT DOCUMENTS

| | | |
|---|---|---|
| DE | 196 23 327 A1 | 12/1997 |
| DE | 197 35 380 C1 | 4/1999 |
| DE | 199 12 511 A1 | 9/2000 |
| DE | 199 14 913 A1 | 10/2000 |
| EP | 0 484 890 A2 | 5/1992 |
| EP | 0 539 953 A2 | 5/1993 |
| EP | 0 648 041 A1 | 4/1995 |
| EP | 0 674 277 A2 | 9/1995 |
| JP | 06217110 A | 8/1994 |
| JP | 2000 232 590 A | 8/2000 |
| JP | 2003-60918 * | 3/2003 |
| WO | WO 99/09734 | 2/1999 |

* cited by examiner

*Primary Examiner*—Jerome Grant, II
(74) *Attorney, Agent, or Firm*—Laurence A. Greenberg; Werner H. Stemer; Ralph E. Locher

(57) ABSTRACT

Traps are produced at color boundaries in a print page that is present in the form of run-length encoded image data, by way of distance mapping. Distances of the run lengths to an adjacent color are determined without decoding the run lengths into a pixel matrix, and the traps are produced on the basis of the distances thus determined. For this purpose, distance vectors are determined for the starting point and for the end point of a run length. The distance vectors are in each case recalculated from the comparison with the distance vectors of adjacent run lengths. The new values of the distance vectors replace the previous values of the distance vectors if the magnitudes of the distances of the new values are less than the magnitudes of the distances of the previous values.

8 Claims, 6 Drawing Sheets

| 3,4 | 2,4 | 1,4 | 0,4 | 0,4 | 0,4 | 0,4 | 1,4 | 2,4 | 3,4 |
|---|---|---|---|---|---|---|---|---|---|
| 3,3 | 2,3 | 1,3 | 0,3 | 0,3 | 0,3 | 0,3 | 1,3 | 2,3 | 3,3 |
| 3,2 | 2,2 | 1,2 | 0,2 | 0,2 | 0,2 | 0,2 | 1,2 | 2,2 | 3,2 |
| 3,2 | 2,1 | 1,1 | 0,1 | 0,1 | 0,1 | 0,1 | 1,1 | 2,1 | 3,1 |
| 3,1 | 2,1 | 1,0 | 0,0 | 0,0 | 0,0 | 0,0 | 1,0 | 2,0 | 3,2 |
| 3,1 | 2,0 | 1,0 | 0,0 | 0,0 | 0,0 | 0,0 | 1,0 | 2,1 | 3,1 |
| 3,1 | 2,0 | 1,0 | 0,0 | 0,0 | 0,0 | 0,1 | 1,1 | 2,1 | 3,2 |
| 3,1 | 2,1 | 1,1 | 0,1 | 0,1 | 0,1 | 0,1 | 1,2 | 2,2 | 3,2 |
| 3,2 | 2,2 | 1,2 | 0,2 | 0,2 | 0,2 | 0,2 | 1,2 | 2,3 | 3,3 |
| 3,3 | 2,3 | 1,3 | 0,3 | 0,3 | 0,3 | 0,3 | 1,3 | 2,3 | 3,4 |

| N2 | N3 | N4 |
|----|----|----|
| N1 | P  | N5 |

Fig. 6A

| N4 | P  | N5 |
|----|----|----|
| N8 | N7 | N6 |

Fig. 6B

| 3,4 | 2,4 | 1,4 | 0,4 | 0,4 | 0,4 | 0,4 | 1,4 | 2,4 | 3,4 |
|-----|-----|-----|-----|-----|-----|-----|-----|-----|-----|
| 3,3 | 2,3 | 1,3 | 0,3 | 0,3 | 0,3 | 0,3 | 1,3 | 2,3 | 3,3 |
| 3,2 | 2,2 | 1,2 | 0,2 | 0,2 | 0,2 | 0,2 | 1,2 | 2,2 | 3,2 |
| 3,2 | 2,1 | 1,1 | 0,1 | 0,1 | 0,1 | 0,1 | 1,1 | 2,1 | 3,1 |
| 3,1 | 2,1 | 1,0 | 0,0 | 0,0 | 0,0 | 0,0 | 1,0 | 2,0 | 3,2 |
| 3,1 | 2,0 | 1,0 | 0,0 | 0,0 | 0,0 | 0,0 | 1,0 | 2,1 | 3,1 |
| 3,1 | 2,0 | 1,0 | 0,0 | 0,0 | 0,0 | 0,1 | 1,1 | 2,1 | 3,2 |
| 3,1 | 2,1 | 1,1 | 0,1 | 0,1 | 0,1 | 0,1 | 1,2 | 2,2 | 3,2 |
| 3,2 | 2,2 | 1,2 | 0,2 | 0,2 | 0,2 | 0,2 | 1,2 | 2,3 | 3,3 |
| 3,3 | 2,3 | 1,3 | 0,3 | 0,3 | 0,3 | 0,3 | 1,3 | 2,3 | 3,4 |

Fig. 7A

| 5   | 4,5 | 4,1 | 4   | 4   | 4   | 4   | 4,1 | 4,5 | 5   |
|-----|-----|-----|-----|-----|-----|-----|-----|-----|-----|
| 4,2 | 3,6 | 3,2 | 3   | 3   | 3   | 3   | 3,2 | 3,6 | 4,2 |
| 3,6 | 2,8 | 2,2 | 2   | 2   | 2   | 2   | 2,2 | 2,8 | 3,6 |
| 3,6 | 2,2 | 1,4 | 1   | 1   | 1   | 1   | 1,4 | 2,2 | 3,2 |
| 3,2 | 2,2 | 1   | 0   | 0   | 0   | 0   | 1   | 2   | 3,6 |
| 3,2 | 2   | 1   | 0   | 0   | 0   | 0   | 1   | 2,2 | 3,2 |
| 3,2 | 2   | 1   | 0   | 0   | 0   | 1   | 1,4 | 2,2 | 3,6 |
| 3,2 | 2,2 | 1,4 | 1   | 1   | 1   | 1   | 2,2 | 2,8 | 3,6 |
| 3,6 | 2,8 | 2,2 | 2   | 2   | 2   | 2   | 2,2 | 3,6 | 4,2 |
| 4,2 | 3,6 | 3,2 | 3   | 3   | 3   | 3   | 3,2 | 3,6 | 5   |

Fig. 7B

METHOD OF PRODUCING TRAPS IN A PRINT PAGE

BACKGROUND OF THE INVENTION

Field of the Invention

The invention lies in the field of digital image processing in reproduction technology and pertains to a method of producing traps at color boundaries in a printed page. Such traps or overfill frames serve to reduce the disruptions caused by register errors in the printing machine, that is to say the errors which arise because the printing inks are not overprinted with exact coincidence, but are shifted somewhat in relation to one another.

In reproduction technology, printing originals for printed pages are produced which contain all the elements to be printed, such as text, graphical objects and images. In the case of electronic production of the printing originals, these elements are present in the form of digital data. For an image, the data are produced, for example, by the image being scanned point by point and line by line in a scanner, each image point being broken down into color components and the color values of these components being digitized. In general, the data for texts and graphical objects are produced directly in a computer by text processing and character programs.

Depending on the output process that is subsequently used, for example output on a color printer or printing in a conventional printing machine, the data for the page elements are produced in the color components red, green and blue (RGB) or in the printing colors of four color printing, cyan, magenta, yellow and black (CMYK), and are stored. The printing colors are printed one above another onto the printing material (for example the paper) in the color printer or in the printing machine.

In the further operating sequence, the digitized texts, graphical objects and images are processed in a processing station, with visual inspection on a color monitor, in multifarious ways in accordance with the predefinitions of a layout. For example, their colors are corrected or their arrangement and form are changed, and are ultimately mounted to form a printed page. The printed-page data are then converted into a data format which is suitable for the output, for example into the page description language PostScript®, and stored. In that case, separate printed-page data are produced for each of the printing colors CMYK. This is referred to as color separation data. The color separation data are recorded at high resolution on film material with a film or plate recorder or directly on printing plates. There are also digital printing machines which operate without printing plates. In this case, the color separation data are transferred directly to the digital printing machine and printed there onto the printing material.

The background of the invention as well as an exemplary embodiment of the invention will now be described with reference to the appended figures of the drawing.

BRIEF DESCRIPTION OF THE DRAWINGS

FIG. 6a shows a point operator F1;

FIG. 6b shows a point operator F2;

FIG. 7a shows a matrix of distance vectors after completion of the distance mapping;

FIG. 7b shows a matrix of distance magnitudes after completion of the distance mapping;

DESCRIPTION OF THE BACKGROUND

Figure 2:
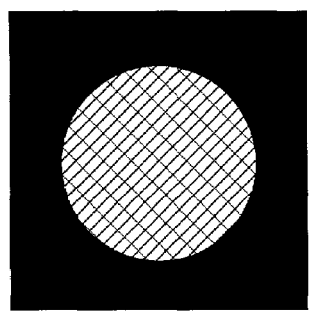
FIG. 2 shows the overprint of the color separations Y, M, K without register errors in the printing machine.
Figure 3:
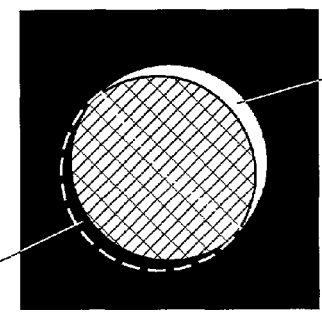
FIG. 3 shows the overprint of the color separations Y, M, K with a register error in the printing machine.

One problem in printing technology is the register errors in the printing machine, that is to say errors which are produced because the printing inks in the printing units, through which the paper runs successively, are not overprinted exactly coincidentally but are shifted somewhat in relation to one another. These errors are to be illustrated by using a simple example, wherein a red circle is printed in a black background area. FIGS. 1a and 1b show the color separations Y and M from overprinting of which the red circle is produced. FIG. 1c shows the color separation K of the black background area, from which the area of the circle is cut out. FIG. 2 shows the printed result when the color separations Y, M and K are overprinted exactly in the printing machine. The color separations Y and M completely fill the cut-out circular area in the color separation K. FIG. 3 shows the printed result when a register error has occurred in the printing machine. In this example, the color separation K has been shifted upward to the right with respect to the color separations Y and M, so that the color separations Y and M no longer completely fill the cut-out circular area in the color separation K, and an unprinted strip 1 is produced. Since the unprinted strip 1 has the color of the paper, that is to say is generally white, it stands out very strongly between the red and the black color and is felt to be disruptive. As a result of the displacement of the color separations, a strip 2, wherein all three color separations Y, M and K are overprinted, is also produced. Since here the lighter printing inks Y and M are printed onto the dark printing ink K, the strip 2 is likewise dark and does not disrupt the printed result. For the purpose of illustration, a very considerable displacement of the color separations is shown in FIG. 3. However, even in the case of a smaller displacement, such as occurs during the practical printing operation, the unprinted strips produced as a result are very disruptive and it is necessary for countermeasures to be taken in order to eliminate or reduce these errors.

One possible way of eliminating or reducing the disruptive effect described as a result of the register errors is more accurate regulation of the printing plate register or the paper guidance in the printing machine. However, this is complicated and expensive, and an improved control system cannot be retrofitted to every older printing machine either.

A second possible way is trapping, as it is called, during the preparation of the color separation data in reproduction technology. In this case, at specific color boundaries in some color separations, a trap (sometimes also referred to as an overfill frame) is produced but not in other color separations. The trapping ensures that in the event of register errors in the printing machine, there is still a sufficiently large overlap of the graphical objects in the color separations, so that no disruptive unprinted strips can be produced. The color separations and the color boundaries for which a trap has to be produced and those for which it does not depends on the colors within the graphical objects in relation to the colors in their immediate surroundings. One general rule here is that the lighter colors are trapped with respect to the darker colors. As a result, the outlines of the contour-determining darker colors are not changed, and the forms of the graphical objects are maintained subjectively in the overprint, in spite of the overlapping of the color separations.

Figure 1:
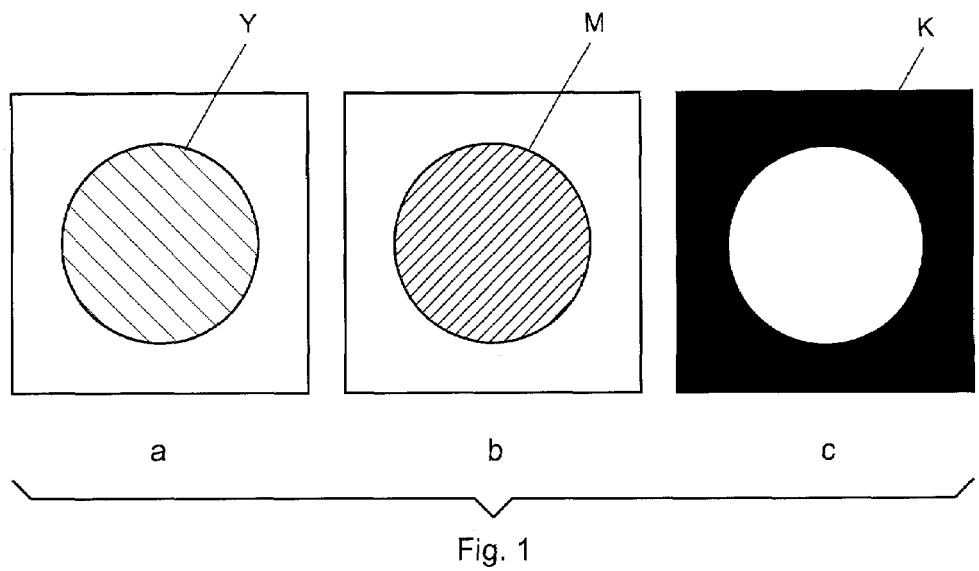
FIG. 1 shows the color separations Y, M and K for a printing example.
Figure 4:
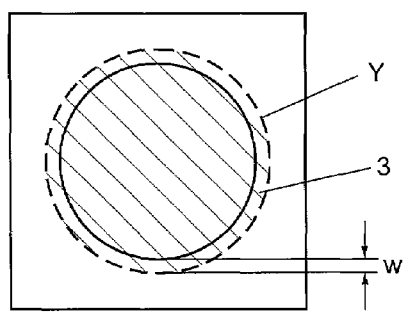
FIG. 4 shows a trap for the color separation Y.

FIG. 4 shows a trap 3 for the color separation Y from the example of FIG. 1, the trap being a circular ring of trap width w. If the circle in the color separations Y and M is enlarged by the trap 3, but the cut-out of the circular area in the color separation K is not, then no disruptive strips can be produced either in the event of displacement of the color separations. The trap width w of the trap 3 must be selected to be sufficiently large that the maximum displacement to be expected is covered, that is to say it depends on the quality and the age of the printing machine used.

According to the prior art, the traps are produced in that, in a printed page, an analysis is first carried out to see which graphical objects are contained therein and where they adjoin one another. Depending on the type of objects and on the colors on both sides of a color boundary, a decision is then made as to which of the objects will be given a trap on which part of its outline and which color the trap will be given. Here, a graphical object is understood to mean an area of any desired shape which is filled in any desired way with color values. In the simplest case, the area is filled uniformly with a constant color. However, it can also contain a color variation, that is to say a continuous variation of the colors in a specific color range. A graphical object can also contain scanned image data or a pattern of various color values. The type of color filling determines the type of graphical object, for example "uniformly colored area" (for example graphics, text), "color variation" or "image".

Such a method of producing traps in accordance with the prior art is described in U.S. Pat. No. 5,113,249. There, the type of a graphical object is designated an "area type" and, depending on the "area types" which are located on both sides of a color boundary, a decision is made as to whether a trap has to be produced, which of the two "area types" is therefore broadened and which color the trap is to be given.

In the case of the methods of the prior art, the types of graphical objects on the printed page and their boundaries have to be determined. If the printed page is defined in an object-oriented page description language, such as PostScript, this can be done by means of analysis of the page description. Such a method is described in U.S. Pat. No. 5,295,236. If the printed page is not present in an object-oriented description but rather, for example, as a matrix of image points, then the graphical objects and their boundary have to be determined with pattern recognition methods. Such methods require a great deal of computing effort.

Further computing effort arises in the case of the methods of the prior art as a result of the calculation of the trap.

After it has been decided which object has to be trapped, a frame with a specific trap width for the outline of the object must be calculated, the outline of a graphical object generally being present as a sequence of vectors. If the graphical object is surrounded by one color on part of its boundary and by other colors on other parts of its boundary, it is generally necessary to calculate a trap only for the parts of the boundary for which a trap is required on account of the mutually adjoining colors. If the printed page data are not present in a vectorial description, but as a matrix of image points, then it is first necessary for contour points to be determined which lie on the color boundaries. On the basis of vectors which connect the contour points, it is then possible for the traps to be calculated.

German patent DE 197 35 380 describes a method of calculating traps which is based on distance mapping. The method assumes that the printed page data are present as a matrix of image points. With distance mapping, for example for each image point outside an object, a distance vector is determined which specifies the distance to the closest image point on the edge of the object. The trap related with the object is then formed by all the image points whose distance vector has a magnitude less than or equal to the trap width w. A method of calculating distance mapping is described, for example, in the technical article by P. -E. Danielsson: "Euclidian Distance Mapping", Computer Graphics and Image Processing, Vol. 14, pp. 227–48 (1980).

Figures 5A, 5B:
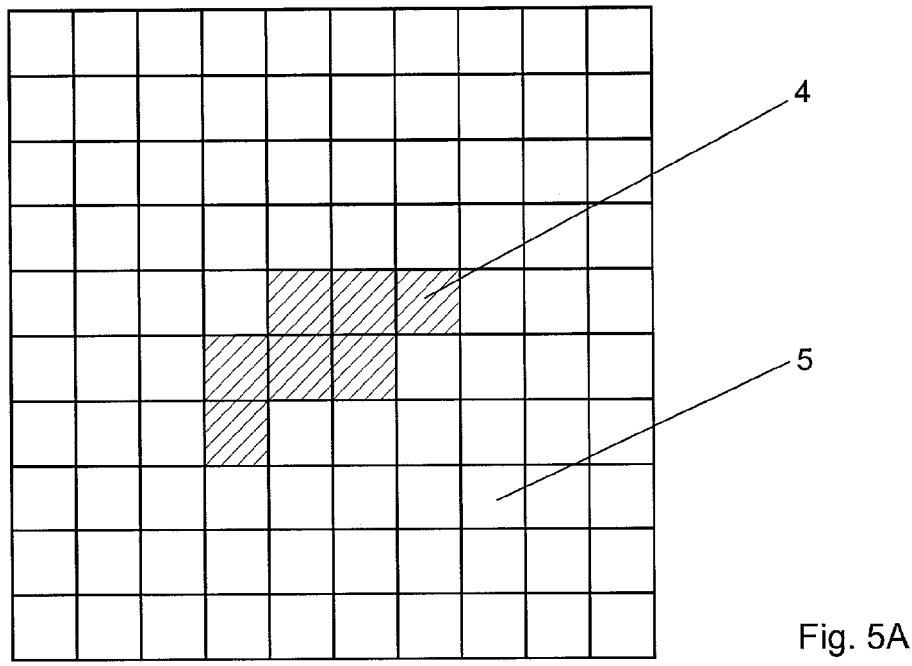
FIG. 5a shows an image point matrix with an object on a background area.
FIG. 5b shows a matrix of distance vectors at the beginning of the distance mapping.

The method of distance mapping will be explained below using a simple example. FIG. 5a shows an image point matrix with an object 4 on a background area 5. The object 4 and the background area 5 have different colors and, in accordance with the trapping rules to be applied, a trap is to be produced around the object 4. FIG. 5b shows an associated distance matrix of distance vectors $D(x,y)$, at the start of the distance mapping, the image points within the object being assigned a distance vector $D(x,y)=(0,0)$, and the image points of the background area 5 being assigned a maximum distance vector, in the example $D(x,y)=(9,9)$. Let the first component of the distance vector $D(x,y)$ be the x component, and the second component the y component. On the outside, around the distance matrix, there is an assumed edge of maximum distance vectors $D(x,y)=(9,9)$. Then, in a first pass, a point operator F1 is applied to each point in the distance matrix, the pass through the distance matrix being made line by line from top to bottom and in each line from image point to image point. FIG. 6a shows the form of the point operator F1. It consists of the point P currently to be calculated and the adjacent points N1, N2, N3, N4, N5 which lie to the left, to the right and above the point P. From the distance vectors $D(N1)$, $D(N2)$, $D(N3)$, $D(N4)$, $D(N5)$ of the adjacent points, by means of the addition of specific increments to the x and y components, in each case a new distance vector for the current point P is calculated. The increments are given by the relative position of the adjacent points N1, N2, N3, N4, N5 in relation to the current point P. Only when the x component and/or y component of one or more of the distance vectors calculated in this way is less than the corresponding component of the current distance vector $D(P)$ will the components of the current distance vector D(P) be replaced by the respectively smallest component of the newly calculated distance vectors.

$$D_{new}(P) = \min \begin{cases} D(P) \\ D(N1) + (1, 0) \\ D(N2) + (1, 1) \\ D(N3) + (0, 1) \\ D(N4) + (1, 1) \\ D(N5) + (-1, 0) \end{cases} \quad (1)$$

In a second pass, a point operator F2 is applied to each point in the distance matrix, the pass through the distance matrix being made line by line from bottom to top and in each line from image point to image point. FIG. 6b shows the form of the point operator F2. It consists of the point P currently to be calculated and the adjacent points N4, N5, N6, N7, N8 which lie to the left, to the right and below the point P. The calculations of the point operator F2 are similar to equation (1).

$$D_{new}(P) = \min \begin{cases} D(P) \\ D(N4) + (-1, 0) \\ D(N5) + (1, 0) \\ D(N6) + (1, 1) \\ D(N7) + (0, 1) \\ D(N8) + (1, 1) \end{cases} \quad (2)$$

FIG. 7a shows the calculated distance matrix after the passes through the two point operators F1 and F2. In the vicinity of the object 4, distance vectors with small values for the x component and y component have resulted and, as the distance from the object 4 increases, the components become larger. The magnitude |D| of the distance is calculated from the x and y components of the distance vectors.

$$|D| = \sqrt{D_x^2 + D_y^2} \quad (3)$$

FIG. 7b shows the magnitudes |D| of the distance. The trap 3 is then formed by the image points with |D|≦w. The trap 3 for the trap width w=2 is identified as an example in FIG. 7b.

In reproduction technology, traps are predominantly generated for texts and graphical elements, such as drawings or colored areas. The corresponding image data is made available at very high resolution, for example 1000 image points/cm and 1000 lines/cm, in order to ensure a sufficiently good edge sharpness of the contours. In order to reduce the amount of data, the graphics/text image data is usually stored in a run-length encoded data format, a sequence of image points of the same color in a line being described by a run-length code. The run-length code consists, for example, of a 4-byte color statement which identifies the color separation values CMYK of the image points in the run length, and a 2-byte run length which identifies the number of image points in the run length. Using such encoding, the graphics/text image data can be compressed considerably. The compression factor that can be achieved depends on the number and density of the color changes in the graphics/text image data, but is typically of the order of magnitude of 100 to 200. Because of this high data compression and the associated saving of storage space and processing times, graphics/text image data in a reproduction system is stored in a run-length encoded data format.

The method described for determining traps with the aid of distance mapping has the disadvantage that it can be carried out only with image data which is present in the form of an image point matrix. Therefore, run-length encoded graphics/text image data has to be decompressed before being processed in accordance with this method and converted into an image point matrix. For a DIN A4 page and the resolution of 1000 image points/cm, the result is an image point matrix of 21×29.7×1000×1000=623,700,000 image points. Using color coding of 4 bytes for each image point (CMYK), the result is a data set of 2,494,800,000 bytes, which have to be loaded portion by portion from a hard drive into the working memory of a computer, processed with the method and stored back again. In the process, in order to calculate the distance mapping, each image point must be compared with its eight adjacent points, that is to say the number of required comparisons is very high, in accordance with the high number of image points. Additional time is consumed for the decompression into an image point matrix and the subsequent compression of the image data supplemented by the traps into the run-length format. It is obvious that the processing time for high-resolution graphics/text image data becomes so great that the method of distance mapping according to the prior art cannot be used economically.

It is accordingly an object of the invention to provide a method of producing traps in a printed image, which overcomes the above-mentioned disadvantages of the heretofore-known devices and methods of this general type and which specifies an improved method with which distance mapping can be carried out directly with run-length encoded graphics/text image data, without this data previously having to be decompressed and converted into an image point matrix. As will become clear, the improved method requires a considerably smaller amount of memory space and permits a considerable reduction in the processing time. On the basis of the distance mapping calculated in this way, the traps are then determined.

SUMMARY OF THE INVENTION

With the foregoing and other objects in view there is provided, in accordance with the invention, a method of producing traps at color boundaries in a print page, which is available in the form of run-length encoded image data, whereby a run length represents a sequence of pixels of equal color. The method comprises:
determining distances of the run lengths to an adjacent color without decoding the run lengths into a matrix of pixels; and
producing the traps based on the determined distances of the run lengths.

In accordance with an added feature of the invention, the method comprises:
determining distance vectors for a starting point and for an end point of a run length;
calculating new values for the distance vectors of a current run length from a comparison with the distance vectors of adjacent run lengths; and
replacing previous values of the distance vectors of the current run length with the new values if the magnitudes of the distances of the new values are less than the magnitudes of the distances of the previous values.

In accordance with an additional feature of the invention, the method comprises:
in a first pass of the image data, processing the run lengths line by line from top to bottom and from left to right in each line, and comparing the distance vectors of the current run length with the distance vectors of adjacent run lengths from the same line and a line lying above; and in a second pass of the image data, processing the run lengths line by line from bottom to top and from right to left in each line, and comparing the distance vectors of the current run length with the distance vectors of adjacent run lengths from the same line and a line lying below.

In accordance with a preferred embodiment of the invention, the distance vectors of the current run length are compared with each distance vector of adjacent run lengths.

In accordance with another feature of the invention, the distance vectors are defined with an x component and a y component; and if the compared run lengths have different colors, the distances of the compared starting points and end points in the direction of the line for the x component and perpendicular to the direction of the line for the y component are used for the components of the new values of the distance vectors of the current run length; and if the compared run lengths have the same color, the components of the new values of the distance vectors of the current run length are calculated by adding the distances of the compared starting points and end points in the direction of the line for the x component and perpendicular to the direction of the line for the y component to the components of the distance vectors of the compared adjacent run lengths.

In accordance with again an added feature of the invention, the current run length is subdivided underneath the boundary between the adjacent run lengths for the first pass and above the boundary between the adjacent run lengths for the second pass. In a preferred embodiment of the invention, the current run length is subdivided only when the magnitude of the distance from at least one distance vector of the adjacent run lengths is less than or equal to a given trap width.

In accordance with again a further feature of the invention, the method comprises:

defining a run length to belong to a trap if a magnitude of the distance of both distance vectors is less than or equal to a given trap width;

separating a portion belonging to a trap from a run length if the magnitude of the distance from only one of the two distance vectors is less than or equal to the given trap width; and defining a run length to not belong to a trap if the magnitude of the distance from both distance vectors is greater than a given trap width.

In accordance with a concomitant feature of the invention, the method comprises:

during the distance mapping, checking whether the color of the current run length is to be trapped with respect to the color of the compared adjacent run length; and if no trap is to be produced for the relevant color boundary, treating the current run length as though the compared run length had the same color as the current run length.

DESCRIPTION OF PREFERRED EMBODIMENTS

Figure 8:
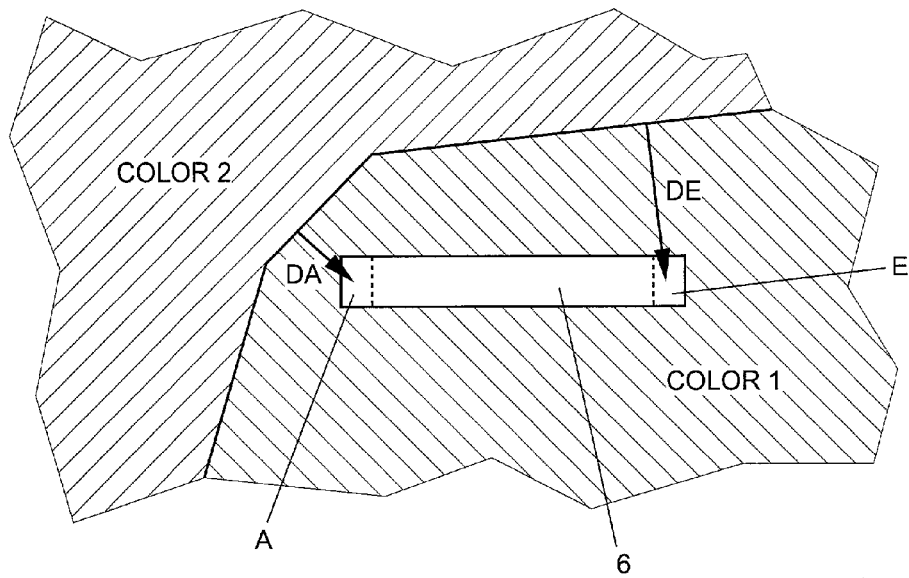
FIG. 8 shows a run length with the distance vectors DA and DE.

According to the method of the invention, distance vectors are in each case determined for the starting point and the end point of the run lengths and are extrapolated as a function of the distance vectors of the adjacent run lengths. FIG. 8 shows a run length 6 which is located in a region of the color 1. The run length 6 describes a sequence of image points of the same color from a starting point A as far as an end point E. A distance vector DA describes the shortest distance of the starting point A from a closest region of another color 2. Likewise, a distance vector DE describes the shortest distance of the end point E from a closest region of another color. The distance vectors in each case have an x component and a y component. Here, the components are designated (DAx, DAy) for the distance vector DA and (DEx, DEy) for the distance vector DE. The magnitudes of the distances are calculated from the components, for example as the Euclidian distance.

$$|DA|=\sqrt{DA_x^2+DA_y^2}$$

$$|DE|=\sqrt{DE_x^2+DE_y^2} \tag{4}$$

However, a simpler distance dimension can be selected, for example:

$$|DA|=DAx+DAy$$

$$|DE|=DEx+DEy \tag{5}$$

According to a preferred embodiment of the invention, for each distance vector, in addition to the components for x and y, the color of the associated run length and the adjacent color to which the distance vector specifies the distance are also stored. The colors can be stored by stating the color separation values, for example CMYK and, if appropriate, additional color separation values for a fifth and further color separations. If printing is to be carried out with more than four color separations, it is more advantageous to store the colors as an index value which points into a color table. Stored in the color table under the appropriate index are all the associated color separation values.

Figure 9A:
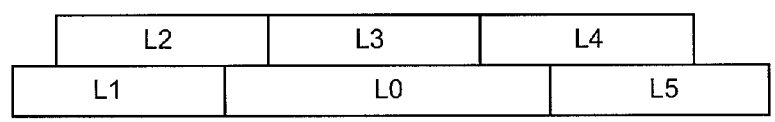
FIG. 9a shows the current run length L0 and the adjacent run lengths L1, L2, L3, L4, L5 for the first pass.
Figure 9B:
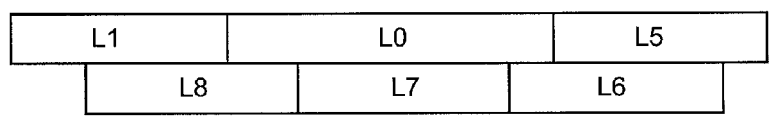
FIG. 9b shows the current run length L0 and the adjacent run lengths L1, L5, L6, L7, L8 for the second pass.

In a first pass through the image data described by the run lengths, each run length is compared with five adjacent run lengths line by line from top to bottom and from left to right in each line. FIG. 9*a* shows the relative position of the currently processed run length L0 and the adjacent run lengths L1, L2, L3, L4, L5. Run length L1 is the run length which immediately precedes the current run length L0 in the line. Run length L2 is the run length which begins on the left of the current run length L0 in the preceding line. Run length L3 is the run length which lies above the current run length L0 in the preceding line. Run length L4 is the run length which ends on the right of the current run length L0 in the preceding line. Run length L5 is the run length which immediately follows the current run length L0 in the line. In a second pass through the image data, the current run length L0 is compared with the five adjacent run lengths L1, L5, L6, L7, L8 line by line from bottom to top and from right to left in each line. FIG. 9*b* shows the relative position of the currently processed run length L0 and the adjacent run lengths L1, L5, L6, L7, L8 for the second pass. In the following text, only the first pass will be described in detail. The second pass is carried out in the same way in mirror-image fashion thereto.

Figure 10A:
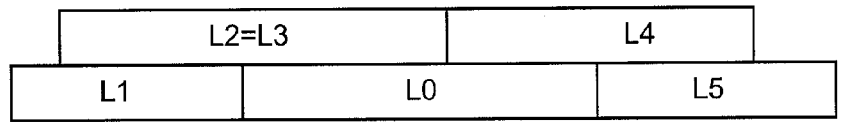
FIG. 10a shows an arrangement with the current run length L0 and three adjacent run lengths.
Figure 10B:
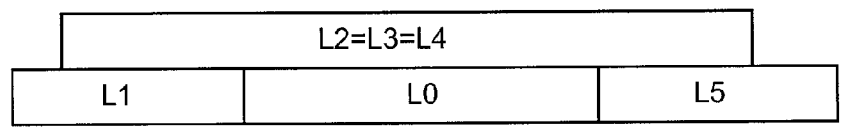
FIG. 10b shows an arrangement with the current run length L0 and two adjacent run lengths.

In the arrangement of run lengths, there are cases wherein the current run length L0 has fewer than five adjacent run lengths. FIG. 10*a* shows an arrangement having four adjacent run lengths, wherein the run lengths L2 and L3 coincide, and FIG. 10*b* shows an arrangement having only three adjacent run lengths, wherein the run lengths L2, L3 and L4 coincide. In these cases, the current run length L0 is compared with the reduced number of adjacent run lengths.

Figure 11:
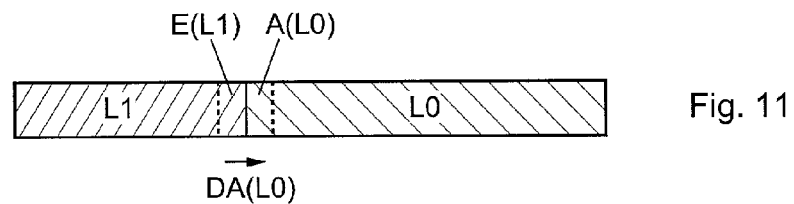
FIG. 11 shows an example of the determination of the distance vector DA(L0) at a color change between adjacent run lengths.

At the start of the first pass, the components of all distance vectors are set to a maximum value. During the comparison of two distance vectors from two adjacent run lengths, a check is first made to see whether the two run lengths have the same color or different colors. If they have different colors, the processed distance vector of the run length L0 is reset in accordance with the actual distance to the compared starting or end point of the adjacent run length, and the corresponding adjacent color is stored in the distance vector. FIG. 11 illustrates this by using an example. The adjacent run lengths L0 and L1 have different colors, which is identified in FIG. 11 by the different hatching. The starting point A(L0) of the run length L0 and the end point E(L1) of the run length L1 are compared with each other. As viewed from the end point E(L1), the starting point A(L0) lies one image point to the right of E(L1) in the same line. The components of the distance vector DA(L0) are therefore set to DAx(L0)=1 and DAy(L0)=0 in this example.

Figure 12:
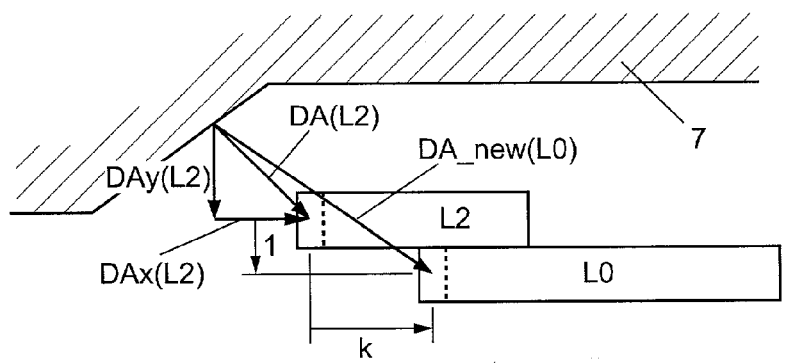
FIG. 12 shows an example of the determination of the distance vector DA(L0) when there is no color change between adjacent run lengths.

If the adjacent run lengths have the same color, for the processed distance vector of the run length L0, a new distance vector is calculated from the distance vector of the compared starting or end point of the adjacent run length and the actual distance of the two points. FIG. 12 illustrates this by using an example. It shows the current run length L0 and the adjacent run length L2, and the region 7 of the adjacent color. The starting point A(L0) of the run length L0 and the starting point A(L2) of the run length L2 may be compared with each other. The distance vector DA(L0) may have the components DAx_old(L0) and DAy_old(L0) (not shown in FIG. 12), and the distance vector DA(L2) may have the components DAx(L2) and DAy(L2). As viewed from the starting point A(L2), the starting point A(L0) lies k image points to the right of A(L2) in the following line. From this, a new distance vector DA_new(L0) having the following components is calculated.

$$DAx\_new(L0)=DAx(L2)+k$$

$$DAy\_new(L0)=DAy(L2)+1 \qquad (6)$$

If the magnitude of the distance |DA_new(L0)| of the new distance vector is less than the magnitude of the distance |DA_old(L0)| of the old distance vector, the old components are replaced by the newly calculated components.

During the comparison of the current run length L0 with the adjacent run lengths L1, L2, L3, L4, L5, the starting point A(L0) and the end point E(L0) are compared with all of the starting and end points of the adjacent run lengths, that is to say the following are compared:

| | | | |
|---|---|---|---|
| A(L0) with A(L1) | A(L0) with E(L1) | E(L0) with A(L1) | E(L0) with E(L1) |
| A(L0) with A(L2) | A(L0) with E(L2) | E(L0) with A(L2) | E(L0) with E(L2) |
| A(L0) with A(L3) | A(L0) with E(L3) | E(L0) with A(L3) | E(L0) with E(L3) |
| A(L0) with A(L4) | A(L0) with E(L4) | E(L0) with A(L4) | E(L0) with E(L4) |
| A(L0) with A(L5) | A(L0) with E(L5) | E(L0) with A(L5) | E(L0) with E(L5) |

Each time, a check is made to see whether the magnitude of the distance for the newly calculated distance vector is less than the magnitude of the distance of the old distance vector and, if so, the newly calculated x,y components are inserted. In addition, the color to which there is the shortest distance is entered as the adjacent color. Then, the run length following the current run length L0 is taken as the next current run length, and the procedure is repeated.

Figure 13A:
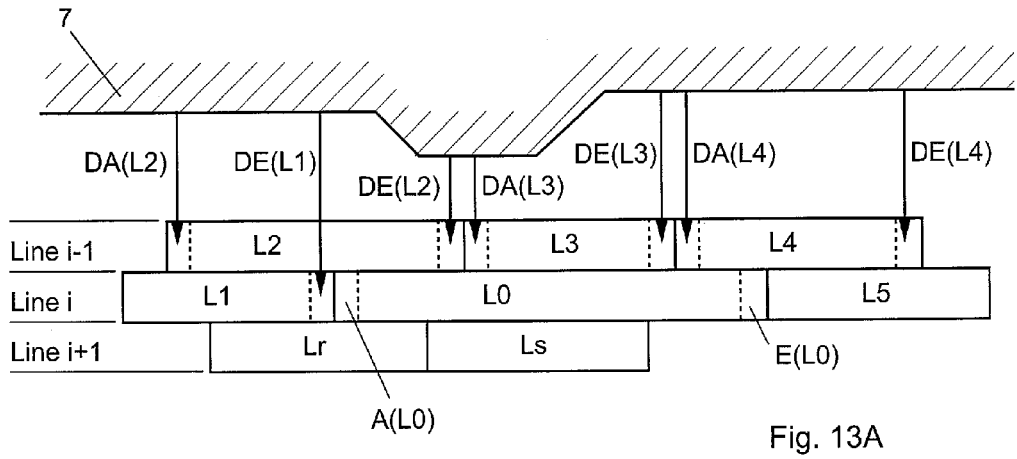
FIG. 13a shows an example to explain the subdivision of the current run length L0.

Before the distance vectors DA(L0) and DE(L0) of the current run length L0 are redetermined on the basis of the distance vectors of the adjacent run lengths L1, L2, L3, L4, L5, it may be necessary for the current run length L0 to be broken down into portions. FIG. 13a illustrates why this is necessary by using an example. It shows the current run length L0 in the line i, the adjacent run lengths L1, L2, L3, L4, L5 in the lines i−1 and i and two run lengths Lr and Ls located further below in the line i+1. In addition, the region 7 of the adjacent color is shown, and some of the distance vectors of the adjacent run lengths in relation to the adjacent color. In this example, the distance vectors DE(L2) and DA(L3) have a shorter distance to the adjacent color than the distance vectors DA(L2), DE(L1), DE(L3), DA(L4), DE(L4). In this situation, in accordance with the computing rule explained by using FIG. 12, the new shortest distance vector DA_new(L0) is recalculated on the basis of the distance vector DE(L1), and the new shortest distance vector DE_new(L0) is recalculated on the basis of the distance vector DA(L4). Newly calculated distance vectors based on the other given distance vectors would be longer and therefore discarded. This would result in the information about the shorter distance of the distance vectors DE(L2) and DA(L3) being lost and that it could no longer be taken into account during the processing of the run lengths Lr and Ls in the following line i+1. As the example of FIG. 13a shows, shorter distances would result for the newly calculated distance vectors of the run lengths Lr and Ls if they were to be calculated on the basis of the distance vectors DE(L2) and DA(L3). This is not possible by the method explained, since these distance vectors do not belong to the adjacent run lengths of Lr and Ls.

Figure 13B:
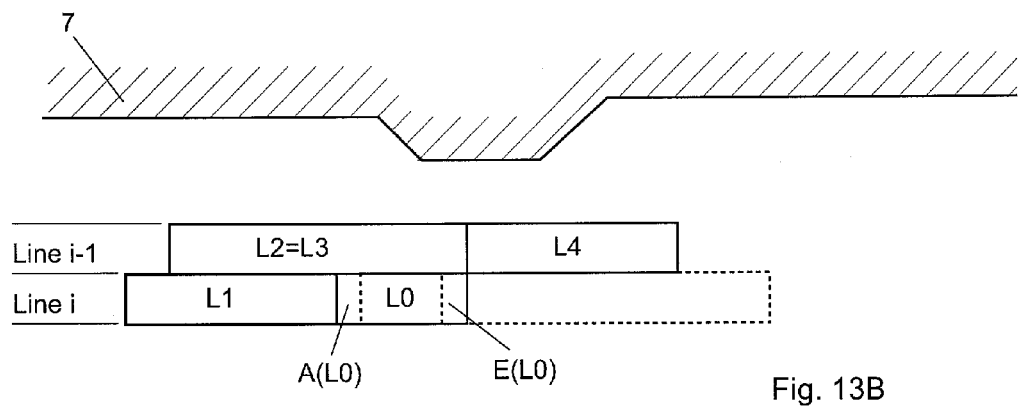
FIG. 13b shows the arrangement of the run length after the subdivision of the current run length L0.

In accordance with the method of the invention, therefore, before the recalculation of the distance vectors, the current run length L0 is subdivided at the x coordinate at which, in the line lying above, the transition between the adjacent run lengths L2 and L3 is located. FIG. 13b shows the subdivision. The left separated portion of the original run length L0 becomes the new current run length L0. The remaining portion is treated as a new run length L5 following L0. Following the subdivision, the adjacent run lengths L2 and L3 coincide for the new current run length L0, and the original run length L3 becomes the new run length L4. The subdivision ensures that the distance vectors from the line i−1 having the shortest distances to the adjacent color are taken into account when calculating the distance vectors for the current run length, and can also be extrapolated in the following line i+1. The subdivision of the run length L0 is expediently performed only when at least one of the relevant distance vectors of the run lengths L2 and L3 has a distance to the adjacent color which is less than or equal to the trap width w. Only then do these distance vectors contribute to the subsequent determination of the traps. Using such a criterion for the subdivision of the run length L0, excessively extensive and unnecessary dismembering of the run lengths is avoided. In addition, processing time is saved. The subdivision of the run length L0 does not have to be carried out exactly at the x coordinate at which in the line i−1 the run lengths L2 and L3 adjoin each other. Adequate distance mapping for the traps to be determined later also results if the subdivision of L0 is carried out in the vicinity of the boundary between L2 and L3.

Figure 14:
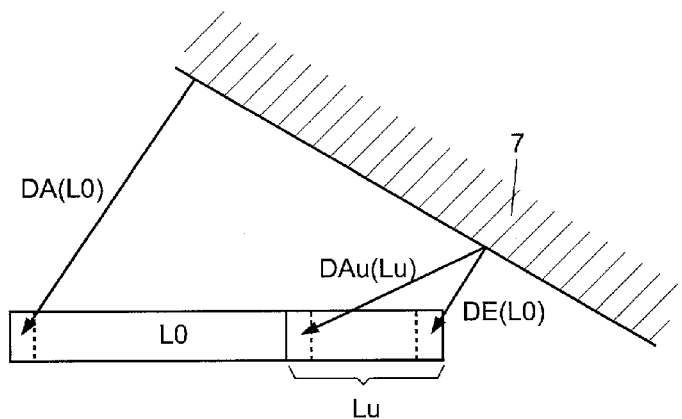
FIG. 14 shows the separation of a portion Lu of the current run length L0 that belongs to the trap.

After the distance vectors of the original run lengths and of the run lengths newly created by means of subdivision have been recalculated in the manner described in the first pass from top to bottom through the run-length encoded image data and in the following second pass from bottom to top, the distance mapping has been concluded and the distance vectors have the shortest distance from the respective closest adjacent color. On the basis of this distance mapping, the traps are then determined. For this purpose on the basis of the stored trapping rules, which specify which colors are to be trapped with respect to which other colors, a check is made for each run length to see whether it is to be trapped with respect to the adjacent color entered for it. If this is the case, a decision is made on the basis of the distance vectors DA(L0) and DE(L0) to see whether the entire run length belongs to the trap, whether part of the run length belongs to the trap or whether the run length does not contribute at all to the trap. For this purpose, the following case distinction is drawn:

(a) |DA(L0)|≦w and |DE(L0)|≦w⇒ the entire run length belongs to the trap
(b) |DA(L0)|≦w and |DE(L0)|>w⇒ a left-hand part of the run length belongs to the trap
(c) |DA(L0)|>w and |DE(L0)|≦w⇒ a right-hand part of the run length belongs to the trap
(d) |DA(L0)|>w and |DE(L0)|>w⇒ the run length does not belong to the trap In case (a), the color of the run length is replaced by the trap color which results in accordance with the trapping rules. In cases (b) and (c), a left-hand and right-hand part, respectively, of the run length belongs to the trap. In order to determine the trap, the run length is then subdivided into a portion Lu, which belongs to the trap, and into a portion which does not belong to the trap. FIG. 14 shows this for the case (c), using an example. It shows a run length L0 whose distance vector DA(L0) has a distance |DA(L0)|>w to the region 7 of the adjacent color and whose distance vector DE(L0) has a distance |DA(L0)|≦w to the adjacent color. At the right-hand end of the run length L0, a portion Lu is separated, becomes part of the trap and is given the trap color. The dividing point is in this case determined in such a way that, starting from the end point of the distance vector DE(L0), a new distance vector DAu(Lu) is at the distance |DAu(Lu)|=w from the starting point of the portion Lu. The remaining portion of the run length L0 does not belong to the trap and keeps its original color.

In a further embodiment of the method of the invention, the processing is accelerated by a check being made, as early as during the distance mapping, to see whether in accordance with the trapping rules, the color of the current run length L0 is to be trapped with respect to adjacent run lengths of different colors. If no trapping is to be produced for the relevant color pairing, the current run length L0 is treated as though all the adjacent run lengths had the same color as the current run length. In this way, fewer distance vectors with a distance≦w result, that is to say the necessity of breaking down the current run length L0 according to FIG. 13b or FIG. 14 into portions occurs less frequently.

Other features which are considered as characteristic for the invention are set forth in the appended claims.

Although the invention is illustrated and described herein as embodied in a method of producing traps in a printed page, it is nevertheless not intended to be limited to the details shown, since various modifications and structural changes may be made therein without departing from the spirit of the invention and within the scope and range of equivalents of the claims.

I claim:

1. A method of producing traps at color boundaries in a print page, which comprises:
   providing print page information in a form of run-length encoded image data, with a run length representing a sequence of pixels of equal color;
   determining distances of the run lengths to an adjacent color without decoding the run lengths into a matrix of pixels;
   determining distance vectors for a starting point and for an end point of the run length;
   calculating new values for the distance vectors of a current run length from a comparison with the distance vectors of adjacent run lengths;
   replacing previous values of the distance vectors of the current run length with the new values if magnitudes of the distances of the new values are less than magnitudes of the distances of previous values; and
   producing the traps based on the determined distances of the run lengths.

2. The method according to claim 1, which comprises comparing the distance vectors of the current run length with each distance vector of adjacent run lengths.

3. The method according to claim 1, which comprises:
   defining the distance vectors with an x component and a y component;
   if the compared run lengths have different colors, using the distances of the compared starting points and end points in the direction of the line for the x component and perpendicular to the direction of the line for the y component for the components of the new values of the distance vectors of the current run length; and
   if the compared run lengths have the same color, calculating the components of the new values of the distance vectors of the current run length by adding the distances of the compared starting points and end points in the direction of the line for the x component and perpendicular to the direction of the line for the y component to the components of the distance vectors of the compared adjacent run lengths.

4. The method according to claim 1, which comprises;
   checking whether the color of the current run length is to be trapped with respect to the color of the compared adjacent run length; and
   if no trap is to be produced for the relevant color boundary, treating the current run length as though the compared run length had the same color as the current run length.

5. A method of producing traps at color boundaries in a print page, which comprises:
   providing print page information in a form of run-length encoded image data, with a run length representing a sequence of pixels of equal color;
   determining distances of the run lengths to an adjacent color without decoding the run lengths into a matrix of pixels;
   determining distance vectors for a starting point and for an end point of the run length;
   in a first pass of the image data, processing the run lengths line by line from top to bottom and from left to right in each line, and comparing the distance vectors of the current run length with the distance vectors of adjacent run lengths from the same line and a line lying above;
   in a second pass of the image data, processing the run lengths line by line from bottom to top and from right to left in each line, and comparing the distance vectors of the current run length with the distance vectors of adjacent run lengths from the same line and a line lying below; and
   producing the traps based on the determined distances of the run lengths.

6. The method according to claim 5, which comprises subdividing the current run length underneath the boundary between the adjacent run lengths for the first pass and above the boundary between the adjacent run lengths for the second pass.

7. The method according to claim 6, which comprises subdividing the current run length only when the magnitude of the distance from at least one distance vector of the adjacent run lengths is less than or equal to a given trap width.

8. A method of producing traps at color boundaries in a print page, which comprises:
- providing print page information in a form of run-length encoded image data, with a run length representing a sequence of pixels of equal color;
- determining distances of the run lengths to an adjacent color without decoding the run lengths into a matrix of pixels;
- determining distance vectors for a starting point and for an end point of the run length;
- defining the run length to belong to a trap if a magnitude of the distance of both of the distance vectors is less than or equal to a given trap width;
- separating a portion belonging to the trap from the run length if the magnitude of the distance from only one of the two distance vectors is less than or equal to the given trap width;
- defining the run length to not belong to the trap if the magnitude of the distance from both of the distance vectors is greater than the given trap width; and
- producing the traps based on the determined distances of the run lengths.

* * * * *